3,272,742
COATED ADSORBENTS AS TREATING AGENTS FOR MINERAL OILS
Arthur T. Polishuk, Media, Pa., assignor to Sun Oil Company, Philadelphia, Pa., a corporation of New Jersey
No Drawing. Filed June 25, 1963, Ser. No. 290,344
8 Claims. (Cl. 252—28)

This invention relates to the prevention of moisture accumulation in mineral oils which contain an additive by treating the oil with a solid adsorbent. It is known to treat mineral oils with a solid adsorbent such as silica gel in order to remove any moisture which may have accumulated in the oil. Such adsorbents, however, often tend to remove the additives normally present in the oil in addition to removing the moisture. Consequently, if at the time the oil is treated with the solid adsorbent there is in fact no moisture present in the oil, the additives are still removed even though the advantage of water removal cannot be obtained. The present invention provides, inter alia, a method for preventing this additive loss prior to the time when moisture is actually present in the oil. The method involves coating the adsorbent with a water-soluble, oil-insoluble material.

Mineral oils have found use in innumerable systems. For example, gasoline is used as a fuel in internal combustion engines. Refrigerator oils are used as lubricants in refrigeration systems and other types of mineral oils are used to lubricate other types of machinery. Mineral oils are also used as hydraulic fluids. A host of other applications for mineral oils are also known. In most systems which utilize, i.e., contain, employ, etc., a mineral oil, the oil contains one or more additives in order to maximize the properties of the oil for the particular system involved. Innumerable mineral oil additives are known and include, for example, phenyl-α-naphthylamine and tetramethyldiaminodiphenylmethane as oxidation inhibitors; aromatic sulfur compounds, sulfurized fatty oils, chlorinated hydrocarbons, and phosphorus acid esters as extreme pressure additives; tricresylphosphate and certain oil-soluble urea derivatives as anti-wear agents; dicyclohexylamine compounds as color stabilizers; metallic sulfonates and metallic naphthenates as corrosion inhibitors, etc.

In many applications such as those mentioned above the mineral oil should have a low moisture content to prevent, for example, corrosion, interference with the operation of the carburetor in internal combustion engines, hydrolysis of the refrigerent in refrigeration systems, etc. In order to remove moisture or maintain the moisture content at a sufficiently low level the mineral oil is in many cases treated with a solid particulate material which will remove moisture by adsorption, chemical reaction, etc. Such materials, of which silica gel is the most common, are referred to herein as solid adsorbents. Normally the treatment is effected by passing the mineral oil through a cartridge type filter containing the solid adsorbent. In addition the cartridge containing the solid material is in most cases an integral part of the system containing the mineral oil so that the mineral oil is continuously treated with the adsorbent. Thus many refrigeration units contain a built-in silica gel cartridge and the oil is continuously circulated through the cartridge. Similarly, in engines using gasoline as a fuel a cartridge containing the adsorbent is sometimes placed between the fuel tank and carburetor with the result that any gasoline which reaches the engine has been treated for moisture removal. As another example a central lubrication facility in an industrial plant often has means for continuously treating the mineral oil with a solid adsorbent in order to prevent moisture accumulation.

As can be seen from the above, moisture removal treatment of the mineral oil is usually carried out on a routine basis. In fact, during most of the treating period there is usually no moisture present in the mineral oil. The treatment is a protective device in that it removes water when and if water appears. The type of treatment described above is usually utilized in systems in which accumulation of water is generally not to be expected but in which if water does appear it must be removed in order to avoid difficulties with the equipment involved. While the treatment described above is satisfactory from a standpoint of water removal or of protecting a system from water accumulation, such a treatment has a disadvantage which arises out of the presence in the mineral oil of additives such as those already mentioned. These additives also tend to be removed by the solid adsorbent; hence as the oil is treated to remove moisture the additives also are gradually removed. The situation is made worse by the fact that during most of the period during which the oil is treated to remove moisture there is no moisture actually present. The additives, however, are still gradually removed even though the attendant advantage of water removal is not obtained. Thus the additives are prematurely removed, i.e., prematurely deactivated. The deactivation is described as premature in that the adsorbent effects the deactivation prior to the time the absorbent effects the desired result, namely, the removal of moisture.

The present invention overcomes this undesirable premature additive deactivation. According to the invention the solid adsorbent used to treat mineral oils in order to remove moisture therefrom is coated with a water-soluble oil-insoluble material. If any moisture is present in the oil the coating dissolves, the adsorbent itself is then exposed to the oil, and the water is removed by the adsorbent in the normal manner. If no water is present in the oil the coated adsorbent remains coated, since the coating is oil-insoluble, and no additives are removed from the oil since the adsorbent itself is not exposed to the oil. The invention embraces (1) a method of treating mineral oils to remove moisture therefrom, (2) an improvement in processes for removing moisture from mineral oils, and (3) a system in which a mineral oil is treated with a coated solid adsorbent to remove moisture. These aspects of the invention are more fully discussed hereinafter.

The solid adsorbent utilized in the invention can be any of the materials conventionally used to remove moisture from mineral oils. Silica gel is most commonly used although other materials such as alumina, calcium chloride, dehydrated clays, etc., are also suitable. Although some moisture removing agents such as calcium chloride are not technically adsorbents for moisture they are referred to herein as such. An adsorbent for the present purpose is any solid material which removes moisture from mineral oil. Silica gel is the preferred adsorbent for the present purpose.

As used to treat the mineral oil, the solid adsorbent is coated with a water-soluble, oil-insoluble material. Any material can be used for the coating so long as it is soluble in water and insoluble in the oil. Gelatin is the preferred coating material although any other material having the recited solubility characteristics can also be used. For example, high molecular weight (100,000–200,000 ethylene oxide units per molecule) ethylene oxide polymers can also be used. Such polymers are known and can be prepared according to the method described in I.E.C., 50, pp. 5–16, January 1958. If the mineral oil to be treated is slightly alkaline, as most mineral oils usually are, cellulose acetate phthalate is a suitable coating material since it is water soluble if the water is lightly alkaline.

The adsorbent can be coated in any convenient method such as by spraying, dipping, etc. For example a known amount of silica gel is stirred in an aqueous gelatin solution. The wet gel is separated and is then dried at 60° C. under vacuum for several hours in order to drive off the water and leave as product silica gel coated with gelatin. The amount of gelatin coating can be determined by the initial and final weights of the silica gel and can be varied by, for example, varying the amount of gelatin in the aqueous gelatin solution. The amount of coating applied to the adsorbent will depend upon such factors as the actual solubility of the coating material in water, the quantity of oil being treated, the tolerable moisture level of the oil, etc. The influence of these factors upon the amount of coating used will be readily apparent to one skilled in the art.

Any mineral oil can be treated according to the invention so long as it contains an additive which is normally removed by the solid adsorbent utilized. Most of the additives presently utilized are adsorbed to some degree, the main variation being the rate of same. The fact of additive adsorption i.e., the presence of an additive normally removed by the adsorbent, is readily determined by merely treating the oil containing a known amount of additive with the uncoated solid adsorbent and determining the additive content after such treatment.

As described the invention embraces any system in which a mineral oil is treated with a solid adsorbent to remove water, the solid adsorbent being coated with a water-soluble, oil-insoluble material and the mineral oil containing an additive which normally would be removed, partially or entirely, by the adsorbent if the latter were uncoated. Such a system can involve any type of equipment, examples of same being the situations described previously where uncoated adsorbents have been used to remove moisture from mineral oils.

The invention is more specifically illustrated as follows:

Example I

The equipment utilized is a refrigeration unit which has an oil capacity of 1 quart. The unit contains an oil circulating line, the line being fitted with a cartridge type filter containing 2 ounces of silica gel. The unit is charged with 1 quart of refrigerator oil (sp. gravity =0.80) containing 1% by weight phenyl-α-naphthylamine as an oxidation inhibitor and containing 0% moisture. The unit is operated for 1 month after which time the oil is removed and is found to have an inhibitor content of 0.75%. Moisture analysis of both the oil and silica gel is negative which indicates that no moisture was present in the system during the 1 month period.

Example II

The procedure is the same as in Example I except that the silica gel used is coated with gelatin by slurrying the gel in a 0.1% aqueous gelatin solution, filtering off the gel, and drying the gel at 60° C. under vacuum. After 1 month's operation the oil has an inhibitor content of 1%. At this time the oil is removed and water is deliberately added thereto until the moisture content of the oil is 0.01%. The oil is then placed back in the refrigeration unit and the latter is operated for 1 hour. The oil is then removed and is determined to have a moisture content of 0%. This example thus shows not only that the coated adsorbent prevents premature deactivation of the inhibitor but also that when moisture is present in the oil the moisture dissolves the coating and is then removed by the uncoated gel.

Substantially similar results are also obtained when other adsorbents are used or when other water-soluble, oil-insoluble coating materials are used.

The invention claimed is:

1. In the treatment of a body of mineral oil with a solid adsorbent to remove water which body of mineral oil contains an additive that would normally be removed by said solid adsorbent during said treatment, the improvement which comprises completely coating said solid adsorbent with a hydroscopic, water-soluble, mineral oil-insoluble material and utilizing the coated solid adsorbent in said system as said solid adsorbent.

2. Method according to claim 1 wherein said solid adsorbent is silica gel.

3. Method according to claim 1 wherein said water-soluble oil-insoluble material is gelatin.

4. Method according to claim 3 wherein said solid adsorbent is silica gel.

5. Method of protecting a body of mineral oil containing an additive from the accumulation of moisture therein without prematurely deactivating said additive which comprises treating a body of mineral oil with a solid adsorbent, said solid adsorbent being completely coated with a hygroscopic, water-soluble, mineral oil-insoluble material and said body of mineral oil containing an additive which would normally be removed by the solid adsorbent when the latter is uncoated.

6. Method according to claim 5 wherein said solid adsorbent is silica gel.

7. Method according to claim 5 wherein said water-soluble, oil-insoluble material is gelatin.

8. Method according to claim 7 wherein said solid adsorbent is silica gel.

References Cited by the Examiner

UNITED STATES PATENTS

| 2,057,938 | 10/1936 | Crawford | 252—194 |
| 2,293,901 | 8/1942 | Hutchinson | 252—194 |
| 2,388,390 | 11/1945 | Cook et al. | 252—194 |

FOREIGN PATENTS

| 280,934 | 2/1929 | Great Britain. |

OTHER REFERENCES

Bennett, H.: Concise Chemical and Technical Dictionary, Chemical Publishing Co., Brookyln, N.Y. (1947), p. 745 most pertinent.

DANIEL E. WYMAN, *Primary Examiner.*

P. P. GARVIN, *Assistant Examiner.*